United States Patent [19]

Webster et al.

[11] Patent Number: 5,724,477
[45] Date of Patent: Mar. 3, 1998

[54] COMPENSATION FOR INPUT VOLTAGE VARIATION IN AN ELECTRIC MOTOR DRIVE

[75] Inventors: Paul Donald Webster, Headingley; Geoffrey Thomas Brown, Hemingbrough; David Mark Sugden, Ilkley, all of United Kingdom

[73] Assignee: Switched Reluctance Drives, Ltd., Harrogate, United Kingdom

[21] Appl. No.: 472,957

[22] Filed: Jun. 7, 1995

[30] Foreign Application Priority Data

Apr. 20, 1995 [GB] United Kingdom ............... 9508051

[51] Int. Cl.$^6$ .................................................. G05F 1/10
[52] U.S. Cl. .......................... 388/815; 388/902; 388/907.5; 318/701; 318/717; 318/723; 318/504
[58] Field of Search ............................ 388/815, 806, 388/809, 902, 907.5; 318/701, 798–815, 715, 717, 719, 721, 723, 636, 479, 504; 364/474.12; 290/44

[56] References Cited

U.S. PATENT DOCUMENTS

| | | | |
|---|---|---|---|
| 4,800,327 | 1/1989 | Fujioka et al. | 318/798 |
| 5,172,291 | 12/1992 | Bakely et al. | 318/560 X |
| 5,206,575 | 4/1993 | Nakamura et al. | 318/807 |
| 5,225,712 | 7/1993 | Erdman | 290/44 |
| 5,233,852 | 8/1993 | Starke | 364/474.12 X |
| 5,239,299 | 8/1993 | Apple et al. | 318/560 X |
| 5,428,283 | 6/1995 | Kalmas et al. | 318/798 |
| 5,440,218 | 8/1995 | Oldenkamp | 318/798 X |
| 5,450,306 | 9/1995 | Garces et al. | 318/811 X |
| 5,483,140 | 1/1996 | Hess et al. | 318/802 |

OTHER PUBLICATIONS

Stephenson and Blake, *The Characteristics, Design and Applications of Switched Relucatnce Motors and Drives*, (Jun. 1993, Nuremberg, Germany).

*Primary Examiner*—Karen Masih
*Attorney, Agent, or Firm*—Arnold, White & Durkee

[57] ABSTRACT

The present invention employs digital circuitry to compensate for variations in DC link voltage transmitted to a switched reluctance machine. The digital voltage compensation system of the present invention periodically samples the DC link voltage and actual rotor speed, then supplies the samples in digital form to a microcontroller that derives a compensated speed signal to compensate for changes in DC link voltage.

13 Claims, 4 Drawing Sheets

| SLOPE | OFFSET | LOWER ENDPOINT | | UPPER ENDPOINT | |
|---|---|---|---|---|---|
| M | C | SCALING | % ERROR | SCALING | % ERROR |
| 53 | 17308 | 10153 | 3.02 | 6814 | 4.5 |
| 54 | 17480 | 10190 | 2.67 | 6788 | 4.86 |
| 55 | 17652 | 10227 | 2.31 | 6762 | 5.22 |
| 56 | 17824 | 10264 | 1.96 | 6736 | 5.59 |
| 57 | 17996 | 10301 | 1.60 | 6710 | 5.96 |

COMPENSATION FOR INPUT VOLTAGE VARIATION IN AN ELECTRIC MOTOR DRIVE

FIELD OF THE INVENTION

The present invention generally relates to an apparatus and method of compensating for DC link voltage variations in an electric motor system. More particularly, the present invention relates to digital circuitry and a method for operating a switched reluctance drive that periodically reads a digital value corresponding to a DC link voltage and adjusts a speed indication signal to compensate for changes in the DC link voltage. The adjusted speed signal is transmitted to a controller where it is used to adjust energization timing of the switched reluctance drive.

BACKGROUND OF THE INVENTION

Electric motors mm electrical energy into mechanical energy to produce work. Electric motors work by applying a voltage across one or more inductors, thereby energizing the inductor(s) to produce a resultant magnetic field. Mechanical forces of attraction or repulsion caused by the magnetic field in turn cause a rotor in an electric motor to move. The efficiency of the electric motor depends in part on the timing and magnitude of each application of voltage to the motor. The magnitude of voltage being applied is particularly important in the case of switched reluctance machines, including switched reluctance motors.

Historically, the switched reluctance motor was thought to be incapable of competing effectively with other types of motors. Part of the problem was the difficulty in controlling the switched reluctance motor. More recently however, a better understanding of motor design and application of electronically controlled switching has resulted in a robust switched reluctance drive capable of high levels of performance over a wide range of sizes, powers and speeds. Note that the term 'motor' is used here, but it will be appreciated by those skilled in the art that the term covers the same machine in a generating mode unless a particular distinction is made.

The general theory of design and operation of switched reluctance motors is well known and is discussed, for example, in *The Characteristics, Design and Applications of Switched Reluctance Motors and Drives*, by Stephenson and Blake and presented at the PCIM '93 Conference and Exhibition at Nuremberg, Germany, Jun. 21–24, 1993.

The switched reluctance motor is generally constructed without conductive windings or permanent magnets on the rotating part of the motor (called the rotor). The stationary part of most switched reluctance motors (called the stator) includes coils of wire wound around stator poles that carry unidirectional current. In one type of switched reluctance motor, winding coils around opposing stator poles are connected in series or parallel to form one phase winding of a potentially multi-phase switched reluctance motor. Motoring torque is produced by applying voltage across each of the phase windings in a predetermined sequence that is synchronized with the angular position of the rotor so that a magnetic force of attraction results between poles of the rotor and stator as they approach each other. Similarly, generating action is produced by positioning the pulse of voltage in the part of the cycle where the poles are moving away from each other.

In typical operation, each time a phase winding of the switched reluctance motor is switched on (or energized), magnetic flux is produced by the phase winding, thereby turning the two opposing stator poles associated with the phase winding into electro-magnets of opposing polarities. The electro-magnetic field created by the energized phase winding causes a force of attraction on the rotor poles. The general construction and operation of controllers for switched reluctance motors is generally understood and is described herein for background purposes only.

In order to maintain the speed and related torque developed by a switched reluctance motor, it is necessary to carefully control when and how much voltage is applied to the phase windings of the motor. Because the supply voltage can vary significantly, a control scheme that ignores changes in supply voltage may experience a significant reduction in ability to control the machine as demanded by the user. This is because the flux produced by the phase windings is directly related to the amount of voltage applied. Accordingly, a change in the supply voltage may result in more or less flux produced by the phase windings than would otherwise be desired. This undesirable change in the flux in the motor can result in the electromagnets created by energization of the phase windings being too strong or too weak resulting in sub-optimum or degraded motor performance.

Many switched reluctance motors are from either battery supplies or, more commonly, from a DC voltage that is derived by rectifying or otherwise converting an AC supply voltage into a DC voltage. In the present application the DC voltage provided to the switched reluctance motor (from a battery, rectifier or otherwise) is referred to as the "DC link voltage". As those skilled in the art will recognize, the DC link voltage available to a switched reluctance motor system is often not constant. Changes in the voltage of the AC supply, changes in the electrical environment in which the motor system operates, and changes in the electrical components used to provide the DC link voltage often result in a DC link voltage that varies over time. These variations in the DC link voltage, if uncompensated, can diminish the performance of a switched reluctance drive.

As discussed above, in switched reluctance drives when and how voltage is applied to the phase windings is very important. In most known switched reluctance drives, the relationship between the speed of the motor, the desired torque, and the time and amount of voltage that is applied to the phase windings is determined empirically through a process referred to as characterization. In characterization the operating parameters of the motor are determined over a wide variety of operating conditions. These operating parameters are then stored in an analog or digital circuit (called a control law table). During operation of the drive, the control system provides the control law table with signals representing the speed of the motor and the desired torque. Circuitry including the control law table in turn produces signals that control the energization of the phase windings. The use of motor controllers with control law tables is generally understood and is not discussed in detail herein.

For some motors, the characterization is accomplished in a process that assumed that the DC link voltage available to the motor system is unchanging. Realizing that the DC link voltage will typically vary, characterization is sometimes done assuming that the DC link voltage is at its lowest expected value. In other words, characterization is done assuming the "worst case" DC link voltage. This type of characterization is undesirable to the extent that it characterizes the switched reluctance drive to run in a worst case scenario—which may never occur—rather than at the desired optimum DC link value. Other motors are characterized at their optimal DC link voltage. For these motors, there must be some compensation for changes in the DC link value during operation or the drive will suffer diminished performance.

Some known switched reluctance drives do not compensate for changes in DC link voltage. These systems necessarily suffer from the operating problems and loss of efficiency that results from such changes. Other switched reluctance drives use an analog system to compensate for DC link voltage variations. In general, these systems compensate for the changes in the DC link voltage by adjusting the speed signal provided to the control law table so that the speed signal provided to the controller is not the actual speed of the motor but a modified speed signal that represents the actual speed signal modified by a signal representative of the DC link voltage.

In typical analog DC link compensation circuits, an analog feedback signal that corresponds to the rotational speed of the motor is sampled at a fixed frequency using pulses having a duty cycle that corresponds to the DC link voltage. This sampling produces a modified analog speed signal that is provided to the control circuit, which may include a control law table. For example, if the DC link value is at or near the desired DC link value, the speed feedback signal may be sampled using pulses with a duty cycle of approximately 90%. This will produce a modified speed signal of a first value. If the DC link value drops below the desired DC link voltage, the duty cycle of the sampling pulses may increase up to 100%, which correspondingly increases the modified analog speed signal provided to the controller. Conversely, if the DC link voltage increases, the duty cycle of the sampling pulses will decrease, reducing the value of the modified analog speed signal provided to the controller. The controller, which may include a control law table, receives the modified signals and produces the signals that control the energization of the motor windings in a manner that compensates for the variations in the DC link voltage.

These analog DC link compensation systems typically suffer from several disadvantages. In particular, these analog systems suffer from the poor accuracy and performance limitations inherent in all analog systems. Moreover, these analog systems require components that are costly and can only operate within a limited operating range. For example, the use of the analog sampling technique discussed above is limited to the extent that the sampling pulses cannot have a duty cycle of greater than 100%. Still further, as digital controllers are integrated into motor control systems, the requirement of an analog DC link compensator results in the need for additional, costly circuitry.

Given the disadvantages of the known analog systems, it is desirable to have a DC link voltage compensation system that is accurate, covers a considerable range of DC link voltages, and is relatively inexpensive.

SUMMARY OF THE INVENTION

The present invention generally relates to an apparatus and method of compensating for DC link voltage variations in an electric drive system. More particularly, the present invention relates to a digital system for accurately and efficiently implementing DC link compensation in a manner that overcomes many of the disadvantages associated with known analog DC link compensation systems. In one embodiment of the present invention, digital circuitry is used to periodically read digital signals representing the DC link voltage and actual rotor speed. The digital circuitry then uses a novel approach to adjust the digital representation of the rotor speed to compensate for changes in the DC link voltage. The compensated speed signal is then transmitted to a controller, which may include a control law table, where it is used to adjust coil energization timing of the switched reluctance drive.

In accordance with a preferred embodiment of the present invention, the foregoing disadvantages of known switched reluctance drive controllers are overcome by utilizing a microcontroller to digitally process signals representing DC link voltage to achieve compensation for DC link voltage variations.

BRIEF DESCRIPTION OF THE DRAWINGS

Other aspects and advantages of the invention will become apparent upon reading the following detailed description and upon reference to the accompanying drawings, in which.

DETAILED DESCRIPTION OF THE INVENTION

While the invention is susceptible to various modifications and alternative forms, a number of specific embodiments have been shown by way of example in the drawings and will be described in detail. It should be understood, however, that this is not intended to limit the invention to the particular forms disclosed. On the contrary, the intention is to cover all modifications, equivalents and alternatives falling within the spirit and scope of the invention as defined by the appended claims.

A preferred embodiment of the present invention effectuates a digital DC link voltage compensation system which adjusts a rotor speed signal in response to a variation in DC link voltage. The digital voltage compensation system provides for improved accuracy and better control of rotor speed and torque in a cost-effective manner.

Figure 1:
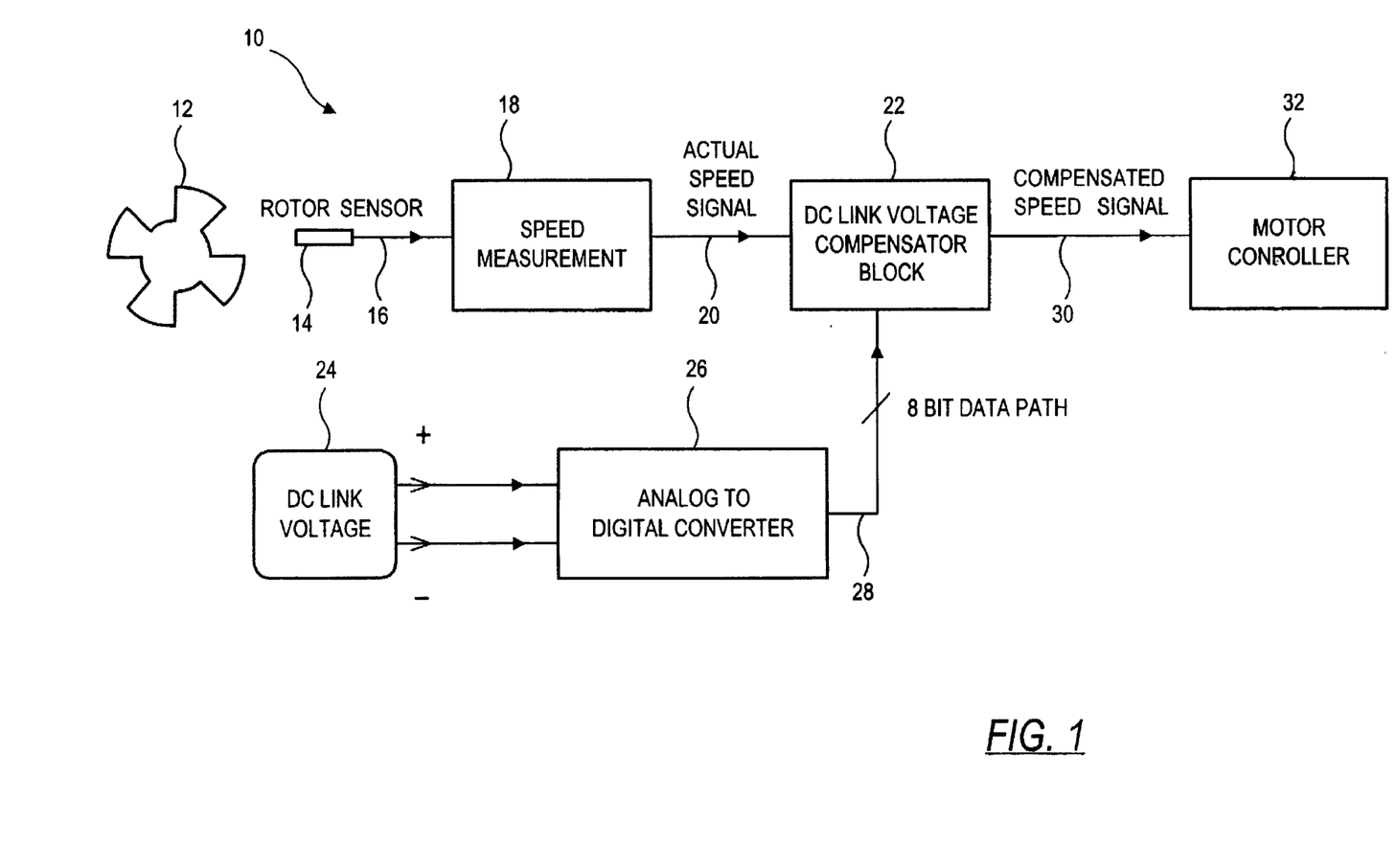
FIG. 1 is a block diagram of a DC link voltage compensation system according to one embodiment of the present invention.

FIG. 1 illustrates a representative block diagram of a digital DC link voltage compensation system 10 for a switched reluctance motor (partially represented by a rotor 12). The voltage compensation system 10 further includes a rotor position sensor 14 (RPT), which is influenced by a member attached to rotate with the rotor, for creating a rotor position sensor output signal 16 representative of the position of rotor 12. It will be appreciated by those skilled in the art that rotor position information can be determined by alternative means, including a rotor position transducer (RPT), by estimating or by deriving the information from motor current, voltage and/or inductance. The sensor 14 shown is shown in block form in FIG. 1 for illustrative purposes. The RPT 14 shown is shown in block form in FIG. 1 for illustrative purposes.

By monitoring the changes in the rotor position over a given time period it is possible to determine approximately the speed of the motor. In FIG. 1, a speed measurement block 18 performs the function of receiving the rotor sensor output signal 16 and providing a speed signal 20 that corresponds to the actual rotational speed of the rotor 12. Construction of the speed measurement block 18 will be straightforward to one skilled in the art and depends on the particular RPT 14 selected. The actual speed signal 20 is provided to a digital DC link voltage compensator block 22.

In addition to sensing the rotational speed of the rotor, the circuit of the present invention also senses the DC link voltage 24. In the embodiment of FIG. 1, an analog to digital converter (ADC) 26 samples the DC link voltage 24 and converts it into a digital output 28 that represents the voltage magnitude of the DC link voltage. The ADC 26 transmits its output 28 to the digital DC link voltage compensator block 22. In one embodiment the ADC output 28 comprises 8 (eight) data bits, allowing for $2^8=256$ different voltage levels to be represented.

The digital DC link voltage compensator block 22 receives the actual speed signal 20 and the ADC voltage output 28 and generates a digital compensated speed signal 30 which is passed to a motor controller 32 associated with the switched reluctance motor (not shown except for the rotor 12). In one embodiment, the digital compensated speed signal 30 is adjusted inversely to changes in DC link voltage 24. For example, a rise in DC link voltage 24 will produce a smaller valued, compensated speed signal 30, while a fall in DC link voltage 24 will produce a larger valued, Compensated speed signal 30. The digital compensated speed signal 30 from the digital DC link voltage compensator 22 is then applied to a motor controller 32 that in one embodiment includes a control law table. Control of the motor is accomplished using the compensated speed signal.

The digital DC link voltage compensator 22 may be implemented in a number of different ways. For example, discrete digital components, or an application specific digital integrated circuit may be used to implement the DC link voltage compensator. In one embodiment of the present invention a digital microcontroller, such as a microcontroller from Motorola's MC68HC11 family of microcontrollers, may be used to implement the DC link voltage compensation method of the present invention. In that embodiment the same microcontroller may be used as the motor controller 32. This embodiment has the advantage of performing DC link voltage compensation without the need for significant additional circuitry over that already required to implement the motor controller 32.

Figure 2:
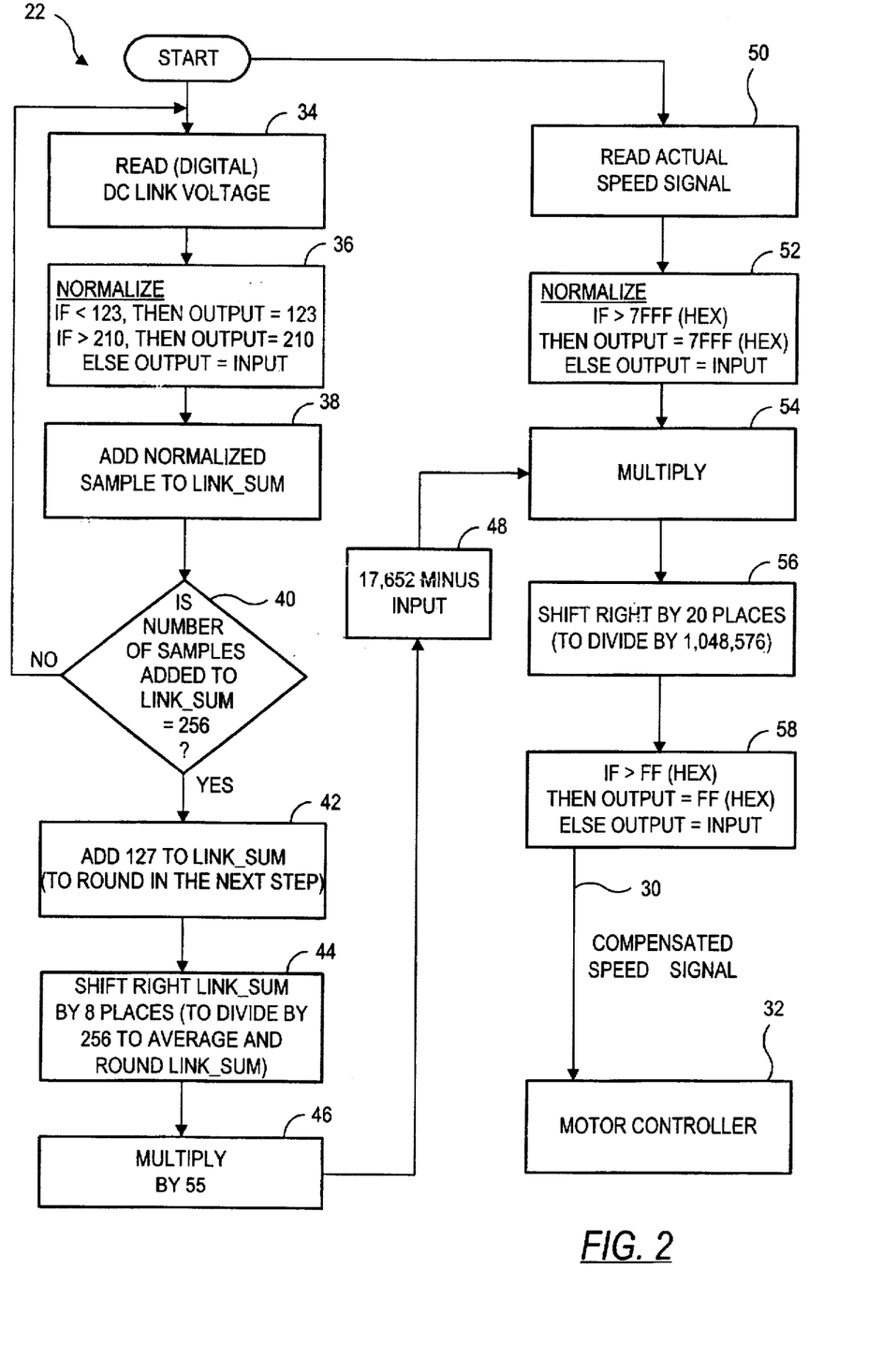
FIG. 2 is a flow chart illustrating a method of implementing a DC link voltage compensation system according to one embodiment of the present invention.

Turning now to FIG. 2, there is shown a flow chart illustrating a preferred method of implementing the digital DC link voltage compensator 22 within the DC link voltage compensation system 10. In particular, FIG. 2 illustrates a method in accordance With the present invention by which the digital DC link voltage compensator 22 may convert the actual speed signal 20 into the compensated speed signal 30.

At the beginning of the process, the digital DC link voltage compensator must first determine the actual DC link voltage. This is accomplished by reading the digital Value provided by the ADC 26 that corresponds to the actual DC link voltage. To avoid having transient changes in the DC link voltage 24 affect the motor operation, the DC link voltage 24 is averaged over a given period of time. In the embodiment of the present invention illustrated in FIG. 2 this reading and averaging is accomplished as follows:

At step 34 the digital DC link voltage compensator 22 reads an eight bit digital output of the ADC 26. At step 36 the digital value corresponding to the DC link voltage is normalized to values corresponding to decimal values between 123 and 210. The normalization range corresponds to a range of DC link voltages that the digital DC link voltage compensator 22 can compensate for and still allow the control system of the drive to accurately control speed and torque.

To accomplish the averaging of the DC link voltage over time, the process of reading the digital signal from the ADC 26 is repeated 256 times. The 256 readings are then added together and divided by 256 to get an average DC link voltage. In the present invention this adding and dividing is accomplished through the use of a binary storage register called link_sum. Each normalized DC link voltage reading is added to link_sum, a binary variable representing a running total, in step 38. In next step 40, a counter tracks whether 256 readings have been added to link_sum, if not, then the process repeats and another set of DC link voltage readings is taken. However, if exactly 256 readings have been added to link_sum, then 127 is added to link_sum in step 42. Adding 127 to link_sum effectively allows link_sum to be rounded in step 42, instead of merely truncating it. The counter is then reset to zero in anticipation of another round of voltage sampling 42. In step 44 link_sum is shifted to the right 8 (eight) spaces, effectively dividing link_sum by $2^8=256$, thereby averaging link_sum to derive an average DC link voltage. The advantage to shifting link_sum to the right eight spaces as opposed to dividing by 256 is that the same result is achieved in far less time. Division is much more time consuming that mere shifting of numbers. Saving time is particularly important in real time systems where the present invention finds particular application.

Once the average DC link voltage has been determined, the digital DC link compensator 22 of the present invention then determines the compensation factor to adjust the actual motor speed signal 20 to compensate for any variations in the DC link voltage. Because the present invention uses digital circuitry, the compensation factor may be selected according to any arbitrary relationship between actual DC link voltage and the compensation factor. In one embodiment of the present invention, the relationship between the actual DC link value and the compensation factor is set such that the compensation factor increases with decreasing actual DC link voltage, and decreases with increasing actual DC link voltage.

Figure 3:
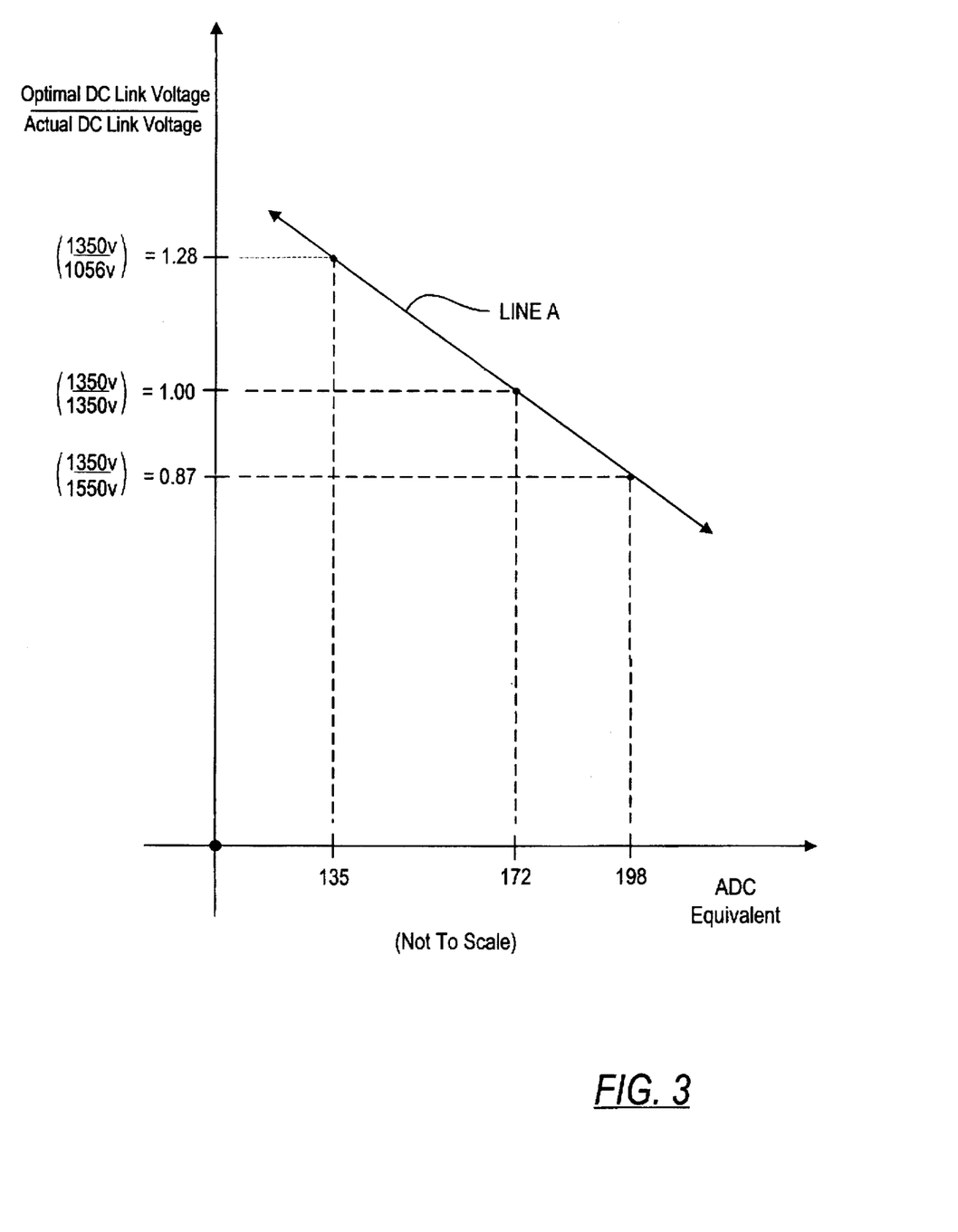
FIG. 3 is a graph illustrating one possible relationship between the DC link voltage and a compensation factor that may be implemented through the use of the present invention.

Line A of FIG. 3 illustrates one desirable relationship between DC link voltage (represented on the horizontal axis in terms of normalized ADC values) and the compensation factor (represented on the vertical axis). In FIG. 3, the relationship between the DC link values and the compensation factor is as follows: the compensation factor is equal to the desired DC link voltage divided by the actual DC link voltage. For example, in one embodiment of the present invention the desired DC link voltage may be 1350 $V_{DC}$, which translates into a normalized ADC value of 172 (based on a 2000 volt scale divided into 256 digital representations). If the actual DC link voltage is 1350 $V_{DC}$ (with an ADC of 172) then the compensation factor should be 1.0 since the actual speed signal does not need to be modified since there is no DC link voltage variation. Using the same example, if the actual DC link voltage is 1550 (with an ADC value of 198) the compensation factor should be (1350/1550) or approximately 0.87. Two examples are illustrated with respect to line A of FIG. 3; when the actual DC link voltage is 1056 volts (with an ADC value of 135) the compensation factor should be approximately 1.28. When the actual DC link voltage is 1550 volts (with an ADC value of 198) the compensation factor should be approximately 0.87. It should be noted that the relationship between DC link voltages and the compensation factors represented by line A of FIG. 3 is but one of many possible relationships that may be used to implement the present invention.

The actual derivation of the compensation factor given the normalized ADC value representing the actual DC link voltage may be accomplished in a variety of ways. For example, a simple look-up table may be used, or the compensation factor may be calculated in some other manner. In the embodiment represented by FIG. 2, the compensation factor is calculated.

Line A of FIG. 3 represents a constant-slope approximation to a non-linear optimal compensation factor. As those skilled in the art will recognize, it is often difficult to exactly describe complex mathematical relationships, and as such, more simple approximations are often used as good, practical substitutes that may be implemented in digital systems. Accordingly, the embodiment represented by FIG. 2 does not implement a precise non-linear optimal relationship between compensation factor and voltage variance, but implements a linear approximation related to the relationship represented by line A as described below.

First it was realized that the relationship represented by Line A can be expressed as Y=MX+C where Y represents the compensation factor, M represents the slope of line A, X represents a digital value corresponding to the actual DC link voltage, and C represents an offset. To determine the characteristics of line A, the slope of line A was calculated. In the example of FIG. 3 this slope M came out to be approximately −0.00646. Because the fractional number 0.00646 was inconvenient to represent digitally, it was multiplied by a large multiplying factor (in this example $2^{13}$ or 8192) to produce a whole decimal integer that could be used in a digital system. In this example the initial slope was approximately −53. Because the right hand side of the equation was multiplied by $2^{13}$ the left hand side must also be multiplied by the same number so that the calculated compensation factor Y when the actual DC link value equalled the desired DC link value (or when the normalized ADC value was 172) would now be $2^{13}$ or 8192 rather than 1. Using those numbers the value C was calculated to be −17308.

It was then noted that while selecting the offset C at −17308 produces the desired compensation factor when the actual DC link voltage is equal to the desired DC link voltage, also produced offset errors at DC link voltages that were either greatly above or greatly below the desired DC link voltage. This would have resulted in the compensation factor being slightly different from the desired compensation factor illustrated by line A. Accordingly, it was decided to select other slopes and compare the relative offset errors at the highest and lowest expected DC link values for the different slopes. A tradeoff between percentage error and overcompensation at the high end was then made.

Figure 4:
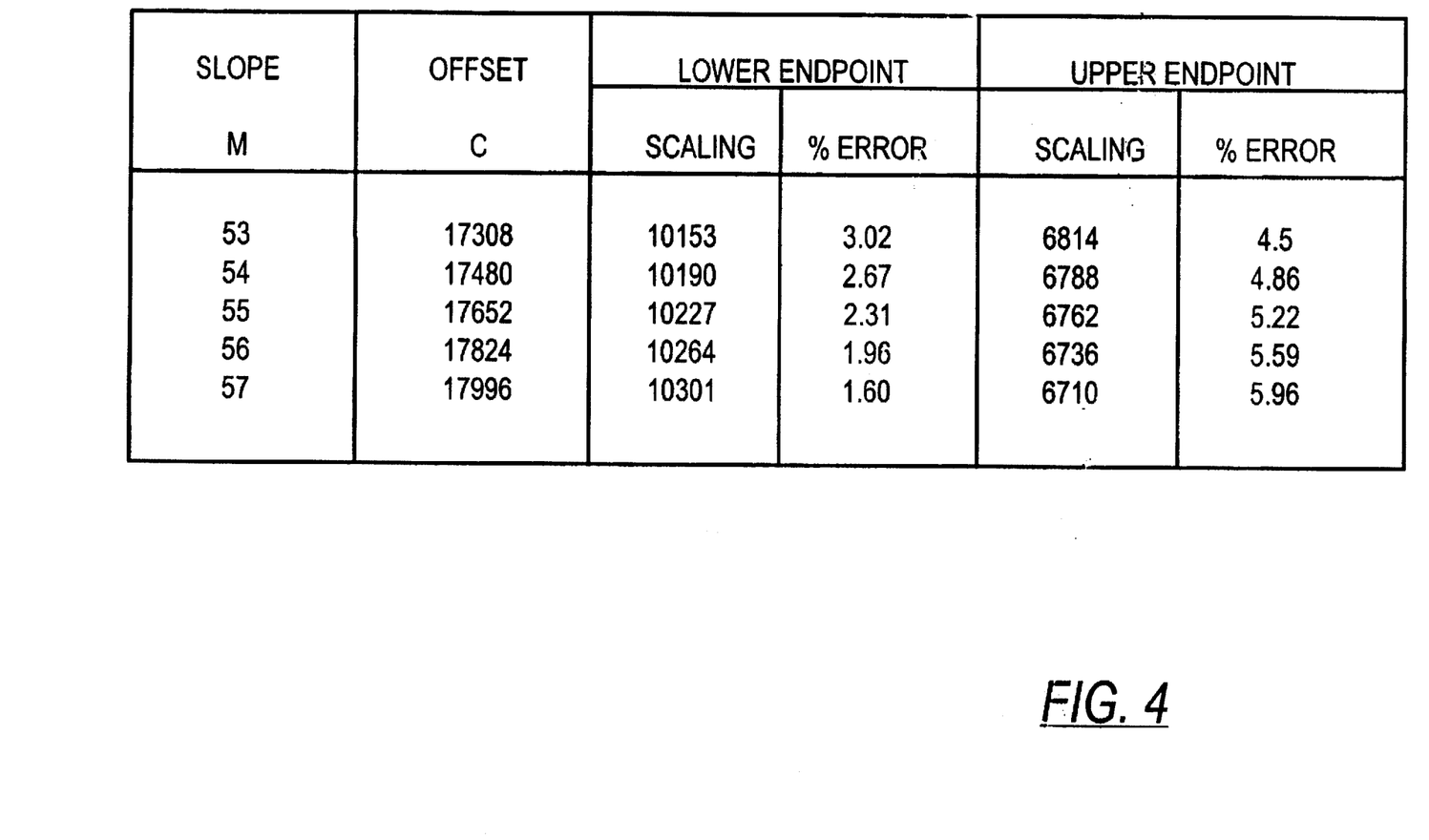
FIG. 4 is a table used to determine an acceptable relationship between the digital representation of the average DC link voltage and a compensation factor.

FIG. 4 illustrates one example of these calculations for slopes of −53, −54, −55, −56 and −57. The chart in FIG. 4 illustrates absolute value of the slope M, the calculated offset C, and absolute value of the percent error from the desired compensation factor represented by line A for the highest and lowest expected DC link voltages. The slope of −55 was selected in the present example, because it represents the preferable tradeoff between percentage error and overcompensation at high voltage. The lowest expected DC link voltage was used to determine the slope because it is believed that it is better to have too much DC link compensation at high actual DC link voltages than not enough at low actual DC link voltages. When a slope of −55 is used, the calculated offset factor C comes out to be 17,652.

The selection of the slope −55 was made for the specific example described herein. Depending on the construction of the motor, the desired operating points and the goals of the system designer, other suitable slopes can easily be selected.

Referring back to FIG. 2, which illustrates an embodiment using a slope of −55, the average DC link voltage that was derived in step 44 (which corresponds to X in the equation provided above) is multiplied by slope value 55 (fifty-five) in step 46. The negative nature of the slope is understood and is not used in the example of FIG. 2. Multiplying the average link voltage by 55 in step 46 enables determination of a corresponding DC link voltage variation. In order to complete the equation Y=MX+C it is necessary to subtract the value obtained by multiplying the average DC link voltage by 55 from 17,652 in step 48, to produce Y the compensation factor.

Having calculated the compensation factor, the digital DC link voltage compensator of the present invention then needs to adjust the measured motor speed 20 to reflect the compensation factor. This is accomplished, generally, by multiplying the actual motor speed 20 by the compensation factor to produce a compensated speed signal 30. That is applied to the controller 32 as discussed above.

In the embodiment of FIG. 2 scaling, normalization and multiplication factors are used to convert the actual speed signal 20 into the compensated speed signal 30. These scaling factors, normalization factors, and multipliers are used to optimize the implementation of the present method in a digital system and to compensate for the scaling and offset factors used to calculate the compensation factor from the actual DC link voltage. Those skilled in the art will recognize that these factors and multipliers may be changed and altered without deviating from the spirit of the present invention.

In the embodiment of FIG. 2, the actual speed signal 20 is received from the speed measurement block 18 and read by the digital DC link voltage compensator block 22 in step 50. Knowing the actual speed provides a baseline which is altered according to variations DC link voltage variations. Once the actual speed signal is read in step 50, it is normalized in step 52. Here normalization requires truncation of values greater than $2^{15}-1=32767$ to be equal to 32,767. This step ensures that the maximum speed signal used to provide a compensated speed signal is never greater than 32.767.

In step 54, the normalized actual speed in digital form, is multiplied by the digital compensation factor calculated in step 48 to produce a digital output which represents a compensated speed signal 30. The digital compensated speed signal 30 may then be provided to the motor controller 32 to control the motor operation as discussed above.

In the embodiment of FIG. 2 the digital compensation speed signal is first scaled and then limited before it is provided to the motor controller. In FIG. 2 the scaling occurs in step 58 where the compensated speed signal is divided by a divisor equal to $2^{13}(8,192)*2^7(128)=2^{20}(1,048,576)$, to produce a scaled compensated speed in step 56. The $2^{13}(8,192)$ component of the divisor offsets multiplication of the slope by the same number above. The $2^7(128)$ component helps to scale the uncompensated speed down to an 8 (eight) bit range. Adjusting the scaled compensated speed to an 8 bit range is completed by truncating values above eight bits in step 58. Thus, in the embodiment of FIG. 2, step 58 results in the production of an 8 bit scaled compensated speed signal 30 which is transmitted to the switched reluctance motor controller 32.

The compensated speed signal 30 functions to provide to the switched reluctance motor controller 32 a way to make adjustments in pulse magnitude, duration and timing based on variations in DC link voltage. The compensated speed signal 30 works within a range of acceptable DC link voltages 24 as normalized and truncated in one embodiment of the present invention described above.

There has been described herein a DC link voltage compensation system and method which adjusts a speed indication signal in response to a variation in DC link voltage.

The program listing attached as Appendix A is a representative listing of a software routine that may be used to construct a DC link voltage compensation system in accordance with the present invention.

While the invention is susceptible to various modifications and alternative forms, a number of specific embodiments have been shown by way of example in the drawings and will be described in detail. It should be understood, however, that this is not intended to limit the invention to the particular forms disclosed. On the contrary, the intention is to cover all modifications, equivalents and alternatives falling within the scope of the invention as defined by the appended claims.

---

APPENDIX A
dc_link_compensation

```
function:   applies a scaling factor to the speed sent to the ASIC according to the voltage
            of the dc link.
void dc_link_compensation()
{
static unsigned int averaging_count , link_sum , link_value;
unsigned char adc_in;
unsigned int multiplier;
unsigned long temp;
            /* first average 256 values read from the ADC measuring the DC link */
adc_in = ADR2;                                  /* read the ADC */
if (adc_in < 123)                               /* limit compensation to 130-210 */
        adc_in = 123;
else if (adc_in > 210)
        adc_in = 210;
link_sum += adc_in;
averaging_count++;
if (averaging_count == 256)
        {
        averaging_count = 0;
        link_value = ((link_sum + 127) >> 8) * 55;
        link_sum = 0;
        }
        /*  now the latest value of "link_value" can be used as the basis of the
            multiplying factor for the speed */
multiplier = 17652 - link_value;
temp = actual_speed;
if (temp > 0x7fff)                              /* limit actual_speed to 2000 rpm*/
        temp = 0x7fff;
temp *= (unsigned long)multiplier;
temp >> = 20;
if (temp > 0xff)
        temp = 0xff;                            /* limit to maximum scaling */
        /* operate on nominal voltage when generating */
if (generating == TRUE)
        compensated_speed = actual_speed >> 7;
else
        compensated_speed = temp;
}
```

---

What is claimed is:

1. A method of compensating for deviations in actual DC link voltage from a desired DC link voltage in an electric drive system including a machine controller that controls a machine in response to a speed signal, the machine including a rotor, and stator windings, the rotor rotating at an actual rotor speed during operation of the machine, wherein the machine controller selectively applies the actual DC link voltage to the machine stator windings, the method comprising the steps of:

periodically sampling the actual DC link voltage and converting the sampled DC link voltage into a digital representation;

periodically sampling the actual rotor speed and converting the sampled actual rotor speed to a digital representation;

generating a compensation factor from the digital representation of the sampled DC link voltage;

multiplying the digital representation of the actual rotor speed by the compensation factor to produce a compensated speed signal; and transmitting the compensated speed signal to the electric machine controller and using the compensated speed signal to control the application of the actual DC link voltage to the machine stator windings.

2. A method of compensating for deviations in actual DC link voltage from a desired DC link voltage in an electric drive system including a machine controller that controls a machine in response to a speed signal, the machine including a rotor, and stator windings, the rotor rotating at an actual rotor speed during operation of the machine, wherein the machine controller selectively applies the actual DC link voltage to the machine stator windings, the method comprising the steps of:

periodically sampling the actual DC link voltage and converting the sampled DC link voltage into a digital representation;

periodically sampling the actual rotor speed and converting the sampled actual rotor speed to a digital representation;

generating a compensation factor from the digital representation of the sampled DC link voltage, wherein the compensation factor corresponds to the desired DC link voltage divided by the actual DC link voltage;

multiplying the digital representation of the actual rotor speed by the compensation factor to produce a compensated speed signal; and transmitting the compensated speed signal to the electric machine controller and using the compensated speed signal to control the application of the actual DC link voltage to the machine stator windings.

3. A method of compensating for deviations in DC link voltage from a predetermined voltage level in an electric drive system including a rotating machine, comprising the steps of:

taking a plurality of DC link voltage samples over a period of time and converting the voltage samples into a plurality of digital representations;

averaging the voltage samples by adding the digital representations of the samples and dividing the sum by the number of samples to derive a digital representation of the average DC link voltage;

converting the digital representation of the average DC link voltage into a digital compensation factor;

sampling a voltage signal representative of the rotational speed of the machine and converting the sampled voltage signal into a digital speed representation;

multiplying the digital speed representation by the digital compensation factor to produce a digital compensated speed signal; and using the compensated signal to control the electric machine.

4. A system for compensating for deviations in DC link voltage from a predetermined voltage level in an electric drive system including an electric machine having a rotor, the electric drive system comprising:

means for sampling the DC link voltage periodically and converting the sampled DC link voltage into a digital representation;

means for sampling an actual rotor speed of the electric drive system periodically and converting the sampled actual rotor speed to a digital representation;

means for comparing the digital representation of the sampled DC link voltage to a digital representation of the predetermined voltage level to provide a digital representation of the deviation of the sampled DC link voltage from the predetermined voltage level; and means for generating a compensated rotor speed signal by adjusting the sampled actual rotor speed with reference to the deviation of the sampled DC link voltage from the predetermined voltage level; and means for transmitting the compensated rotor speed signal to the electric drive system.

5. The system for compensating for deviations in DC link voltage from a predetermined voltage level in an electric drive system, according to claim 4, wherein the means for generating a compensated rotor speed signal further comprises:

means for normalizing the sampled DC link voltage to be within a predetermined range;

means for accumulating a plurality of normalized voltage samples;

means for averaging the normalized voltage samples; and means for multiplying the sampled actual rotor speed by a ratio of a denominator comprised of the predetermined voltage level and a compensation factor.

6. The system for compensating for deviations in DC link voltage from a predetermined voltage level in an electric drive system, according to claim 5, wherein the means for generating a compensated rotor speed signal further comprises:

means for normalizing the sampled actual rotor speed to be within a predetermined range.

7. The system for compensating for deviations in DC link voltage from a predetermined voltage level in an electric drive system, according to claim 5, wherein the means for generating a compensated rotor speed signal further comprises:

digital means for normalizing the voltage samples by making all voltage samples below a lower numerical limit equal to the lower numerical limit and all voltage samples above a higher numerical limit equal to the higher limit;

digital means for averaging and rounding the voltage samples;

means for multiplying the averaged and rounded voltage sample to produce a compensation factor;

means for detecting the actual rotor speed;

digital means for truncating the actual rotor speed for values above a predetermined threshold;

digital means for multiplying the actual rotor speed by the compensation factor to produce an interim rotor speed signal;

means for dividing the interim rotor speed signal by a predetermined divisor to produce a scaled interim rotor speed signal; and means for truncating scaled interim rotor speed signals greater than a predetermined amount to produce the compensated rotor speed signal.

8. The system of claim 4 wherein the means for generating the compensated rotor speed signal is a microprocessor.

9. A system as claimed in claim 4 wherein the means for sampling includes means for averaging a plurality of DC link voltage samples to derive the digital representation.

10. A method of compensating for deviations in actual DC link voltage from a desired DC link voltage in an electric drive system including a machine controller that controls a machine in response to a speed signal, the machine including a rotor, and machine stator windings, the rotor rotating at an actual rotor speed during operation of the machine, and wherein the machine controller selectively applies the actual DC link voltage to the machine stator windings, the method comprising the steps of:

periodically sampling the actual DC link voltage and converting the sampled DC link voltage into a digital representation;

periodically sampling the actual rotor speed and converting the sampled actual rotor speed to a digital representation;

producing a compensated speed signal by scaling the digital representation of the actual rotor speed as a function of the relationship between the actual DC link voltage and the desired DC link voltage; and transmitting the compensated speed signal to the electric machine controller and using the compensated speed signal to control the application of the actual DC link voltage to the machine stator windings.

11. A method as claimed in claim 10 in which the step of producing a compensated speed signal comprises the step of multiplying the digital representation of actual rotor speed by a compensation factor, the compensation factor being generated from the digital representation of the actual DC link voltage.

12. A method as claimed in claim 11 further comprising the step of selecting the compensation factor as a function of the desired DC link voltage divided by the actual DC link voltage.

13. A method as claimed in claim 12 further comprising the step of deriving each digital representation of the actual DC link voltage as an average of a plurality of samples.

* * * * *